US009355241B2

United States Patent
Barthelemy

(10) Patent No.: US 9,355,241 B2
(45) Date of Patent: May 31, 2016

(54) METHOD FOR PROVIDING A DYNAMIC CODE VIA A TELEPHONE

(75) Inventor: Serge Barthelemy, Montpellier (FR)

(73) Assignee: PAYCOOL INTERNATIONAL LTD., Hong Kong (CN)

( * ) Notice: Subject to any disclaimer, the term of this patent is extended or adjusted under 35 U.S.C. 154(b) by 569 days.

(21) Appl. No.: 13/575,483

(22) PCT Filed: Jan. 26, 2011

(86) PCT No.: PCT/FR2011/000054
§ 371 (c)(1),
(2), (4) Date: Nov. 19, 2012

(87) PCT Pub. No.: WO2011/095704
PCT Pub. Date: Aug. 11, 2011

(65) Prior Publication Data
US 2013/0060892 A1 Mar. 7, 2013

(30) Foreign Application Priority Data

Jan. 28, 2010 (FR) ...................................... 10 00347

(51) Int. Cl.
*G06F 21/42* (2013.01)
*G06F 21/31* (2013.01)

(52) U.S. Cl.
CPC .............. *G06F 21/42* (2013.01); *G06F 21/313* (2013.01)

(58) Field of Classification Search
CPC ................................ G06F 21/42; G06F 21/313
USPC ................... 709/217, 219, 223, 225, 227, 228
See application file for complete search history.

(56) References Cited

U.S. PATENT DOCUMENTS

| 5,604,791 | A  | * | 2/1997 | Lee .............................. 379/88.21 |
| 8,185,443 | B2 | * | 5/2012 | Marcus ........................ 705/26.1 |
| 8,751,801 | B2 | * | 6/2014 | Harris et al. .................. 713/168 |
| 2009/0063312 | A1 | * | 3/2009 | Hurst ............................. 705/30 |

FOREIGN PATENT DOCUMENTS

| EP | 1 739 588 A1 | 1/2007 |
| GB | 2 362 489 A | 11/2001 |

OTHER PUBLICATIONS

International Search Report (PCT/ISA/210) issued on Jun. 9, 2011, by the European Patent Office as the International Searching Authority for International Application No. PCT/FR2011/000054.
Written Opinion (PCT/ISA/237) issued on Jun. 9, 2011, by the European Patent Office as the International Searching Authority for International Application No. PCT/FR2011/000054.

* cited by examiner

*Primary Examiner* — Viet Vu
(74) *Attorney, Agent, or Firm* — Buchanan Ingersoll & Rooney PC

(57) ABSTRACT

A user provides an identifier to a computer server operating an online service by means of a network terminal connected to the computer server by a digital network. The user also provides a dynamic code that is to be used with the online service. The dynamic code is made up of a subset of digits that make up the number of a calling line, selected by a code server from among a set of available lines, so as to call the telephone of the user. The number for the dynamic code is transmitted to the online service by the code server. The dynamic code is extracted from the number for the calling line on the basis of an extraction rule indicated by the online service on the network terminal of the user.

15 Claims, 3 Drawing Sheets

METHOD FOR PROVIDING A DYNAMIC CODE VIA A TELEPHONE

The present invention relates to a method for generating, delivering and checking dynamic code. The method is of the type in which the dynamic code is made available to a user notably via a mobile or fixed line telephone. The dynamic code can then be used, for example, to authenticate the user with the server of an online service, or for any other use that requires a dynamic code to be obtained.

STATE OF THE ART

In the digital economy, the number of online services and applications is greatly expanding and access to these services, like the validation of certain actions, requires either the authentication of the users or the digital validation of certain actions, even digital signing.

The implementation of these methods of authentication with online services, or of signature validation, very often involves the use of a dynamic password or code (also called "one-time password") which is verified directly or indirectly either by the entity which requires it (for example an online service), or by an independent third party.

In particular, there is an increasing demand among online service operators, such as banks for example, for safer authentication methods that in particular make it possible to increase the security with respect to attacks of the phishing type which involve cunningly obtaining a user's static password for an online service. Increasing this security entails abandoning the static passwords and replacing them with dynamic passwords or authentication methods with a number of factors using one-time codes.

Now, there are already various methods for generating and supplying a user with a dynamic password, for example by:
- generating a code or password from using a dedicated tool, such as the one marketed by RSA under the brand name "SecureID". This tool makes it possible to compute and display a code which varies as a function of time, for example every 60 seconds;
- generating a dynamic code from cryptographic calculators using chip cards;
- using SMS (short message service) to send a dynamic code to a cell phone of the user;
- generating a dynamic code using a specific software application installed on the cell phone or the SIM card of the telephone; such a solution has been described in the French patent application number FR 08/00440 filed by the same applicant.

Most of these known methods obviously offer increased security compared to the use of static codes, but there are still one or more drawbacks, the main one very often being the cost of use, either because the dynamic code generation tool is itself costly, or because the cost of routing such a code to the user is significant (for example, the cost of an SMS to send each new code). To that is added the additional drawback that the banks or other organizations offering online services do not know in advance how many one-time codes will be needed, and consequently what will be the corresponding cost, since this number depends solely on the number of cases of use of these codes.

AIM OF THE INVENTION

The general aim of the present invention is consequently to provide a solution to the problems posed by the systems for supplying and routing one-time codes used hitherto.

Another more specific aim of the invention is to propose a method for supplying dynamic codes that makes it possible to overcome the issues of deployment and cost, in order to allow massive use of the dynamic codes within the framework of the infrastructures for online services.

In order to ensure a better clarity of the following description of the invention, it is useful to introduce a certain number of definitions of the main elements involved in implementing the method.

Online service: This is a service or an application that is available or supplied digitally via a digital network (of internet or equivalent type, telecommunication network, etc.) and which asks its users to input a dynamic code to validate some of their actions (for example a so-called "login" code to allow access to the service, or the provision of an authentication code in the context of a multiple-factor authentication method, or for the validation of transactions or digital signature, etc.).

Code server: This is a computer server having:
- secure connection capabilities with one or more online services,
- data management and processing capabilities,
- connections with one or more voice telephony networks,
- access to a significantly large number of calling telephone lines (advantageously, several thousands or tens of thousands of lines), called available lines,
- a program and an algorithm that are capable of producing, at the request of an online service, the selection of a line number suitable for responding to said request (from the available lines) and for initiating a call from the selected line to the telephone number of a user.

The code server within the meaning of the invention may be operated either by the online service or by an entity that is independent of the online service.

Available lines: These are telephone lines each having a different telephone number, made available (permanently or temporarily) to the code server and from which the latter can make calls to the telephones of the users.

Calling line: This is the line selected by the code server, on the basis of the parameters supplied by the online service in its dynamic code request. The calling line is selected from the available lines to make a call to the telephone of a user, and of which the number has to be displayed on said telephone, or any equivalent device suitable for receiving a telephone call, such as, for example, a computer provided with a modem.

User: This is a person having, on the one hand, a network terminal to access online services, and, on the other hand, a telephone for personal use or any device suitable for receiving a telephone call and for displaying the number of a calling line. The user wants to have access to and/or use the functionalities of an online service to which he or she will first have communicated his or her telephone number.

Dynamic code: This is a code intended to be used directly or indirectly only for a single action or transaction between the user and the online service and whose validity period is advantageously limited in time (of the order of a few minutes).

OBJECT OF THE INVENTION

These aims are achieved by the method according to the invention. In order to solve the problem posed, the invention makes an innovative use of the code servers which are used by the online services. In effect, the invention provides for the generation of the dynamic codes which are then transmitted to the user by the code server, by means of a call to the telephone of the user from a calling line chosen by the code server. This choice of calling line is determined on the basis of a specification issued by the online service.

Furthermore, the dynamic code is contained in, and transported directly by, the number of the calling line which is viewed by the user on his or her telephone, while avoiding the generation of the cost of a call or of an SMS.

It follows that, in the invention, the object (the code) and its transmission means (the number of the calling line) are intermingled: it is the transmission means which is the code.

More specifically, the subject of the invention is a method for supplying the user of an online service with a dynamic code via a telephone, in which said user supplies, on the one hand, an identifier to a computer server operating an online service, by means of a network terminal connected to said computer server by a digital network, and, on the other hand, a dynamic code intended to be used with the online service, said method being characterized in that the dynamic code is made up of a subset of the digits that make up the number of a calling line, selected by a code server from a set of available lines to call the telephone of the user, and the number of which is transmitted to the online service by the code server.

Advantageously, the number of the calling line, containing the dynamic code, is determined by an algorithm implemented by the code server, on the basis of a set of parameters included in a dynamic code request transmitted by the online service.

For a particular choice of the parameters included in the dynamic code request, the determination of the calling line number by the code server can be made by a random selection of the number of the calling line from the numbers of available lines for the code server.

Advantageously, the dynamic code is determined from the calling line number used by the code server to call the telephone of the user, by a dynamic code extraction rule, which designates the digits of the telephone number of the calling line to be taken into account to make up the dynamic code.

The dynamic code extraction rule may be fixed, but it could also vary and be redefined by the online service on the occasion of each dynamic code request.

As an example, the digits that make up the dynamic code may be made up by the last 4, 5 or 6 digits of the number of the calling line. This very simply makes it possible for the user to select from the digits of the number of the calling line those that correspond to the dynamic code, by applying the extraction rule supplied by his or her network terminal.

As a variant, the dynamic code may be made up of the positions of a predetermined subset of digits taken from the digits that make up said telephone number of the calling line, the positions of the digits to be taken into consideration for the dynamic code being indicated in the message transmitted by the online service to the network terminal of the user.

There are two methods for extracting and using the dynamic code from the calling line number, namely a manual mode, and a more automated mode involving a specific application installed on the telephone of the user.

Thus, in a manual extraction mode, the user will be able to simply view the number of the calling line which is displayed on the screen of his or her telephone, and manually extract therefrom the digits of the dynamic code, based on the extraction rule which is displayed on the screen of his or her network terminal. Then the user will input the digits of the dynamic code on his or her network terminal, for the dynamic code to be transmitted to the software of the online service which will compare it to the reference dynamic code obtained via the code server.

In another, more automated, mode of use, the number of the calling line may be captured, once the call is made, by a software application installed for this purpose on the telephone of the user or any equivalent device. This application will then extract from the number of the calling line the dynamic code to perform the task for which it was provided, for example the creation of another code, the generation of a digital signature, etc. The extraction will be done either on the basis of an extraction rule predefined in the software of the telephone of the user, or an extraction rule communicated by the online service to the telephone of the user.

To give more detail, the method according to the invention also comprises the following steps:

transmission by the online service to said code server of a request to send a dynamic code to a given user of the online service, together with a set of parameters specifying the dynamic code;

transmission by the online service of a call notification sent to the network terminal of the user;

after the selection by the code server of a calling line telephone number, transmission by the code server of the number of the duly selected calling line to the server of the online service, and extraction by said server of the dynamic code from the calling line number;

initiation of a telephone call by the code server to the telephone of the user, using the previously selected calling line number;

on reception of the telephone call by the telephone of the user, manual or automatic extraction of the dynamic code on the basis of the calling line number and of the previously notified extraction rule;

transmission by the user of the duly extracted dynamic code to the server of the online service, by means of his or her network terminal;

on reception of the dynamic code by the server of the online service, comparison between the locally obtained dynamic code and the dynamic code transmitted by the user, and if the two dynamic codes match, validation of the dynamic code transmitted by the user.

According to the invention, in order for the user to know that he or she will be receiving a dynamic code, a call notification is sent to the network terminal of the user, on the one hand to indicate that a dynamic code is incorporated in the calling line number used by the code server to call the telephone of the user, and on the other hand to communicate the rule for extracting the dynamic code from the calling line number.

Advantageously, the notification transmitted to the network terminal of the user comprises instructions to not answer the call originating from the calling line. This makes it possible to display the calling line number including the dynamic code without generating communication costs.

Alternatively, the code server is programmed to cut the telephone communication sent from the calling line to the telephone of the user after the first ring, which makes it possible to achieve the same result.

Preferably, the calling line number selected from the available lines according to the parameters supplied to the code server is valid only for a limited period, typically of the order of a few minutes, in order to increase the security linked to the use of the dynamic code.

The method according to the invention is implemented partly by a specific software module incorporated in the server of the online service, and which implements the following steps:

reception on behalf of a user terminal of a request to access the online service hosted by the computer server;

generation of the specification of the dynamic code, in the form of a series of parameters, on the basis of the user and of the use which will be made of the dynamic code, and generation of the rule for extracting the dynamic code from the calling line number;

transmission of a dynamic code request, specified by a set of parameters, to the code server;

reception of a calling line number, from the code server;

local extraction on the server of the online service of the dynamic code from the calling line number;

reception of the dynamic code transmitted by the user terminal;

comparison of the locally extracted reference dynamic code, and of the dynamic code transmitted by the user terminal, and if the two codes match, the dynamic code of the user is declared valid by the online service and the access of the user to the online service is authorized; otherwise, an error message is prepared by the software module of the online service for display on the network terminal of the user.

The method according to the invention is also partly implemented by another software module incorporated in the code server and implementing the following steps:

reception of the dynamic code request and of the parameters specifying it, transmitted by the software of the server operating the online service;

selection of a calling line from the available lines, on the basis of the dynamic code request transmitted by the software of the server operating the online service, and of the parameters associated therewith;

sending of a telephone call from the calling line to the telephone number of the user;

transmission of the number of the calling line to the software of the online service, then return to the start pending the next dynamic code request.

Another subject of the invention is a system for supplying the user of an online service with a dynamic code via a telephone, in which said user supplies, on the one hand, an identifier to a computer server operating an online service, and, on the other hand, a dynamic code intended to be used by the user with the online service, said system comprising:

a network terminal connected to said computer server by a digital network;

a user telephone suitable for displaying the telephone number of a calling line;

said system being characterized in that it also comprises:

a computer server operating an online service;

a code server linked to said computer server by a secure digital link;

said computer server comprising a software module suitable for specifying a dynamic code request in the form of a series of parameters, on the basis of the user and of the use of the dynamic code, for generating a rule for extracting the dynamic code and for transmitting such a dynamic code request to the code server;

said code server comprising a software module suitable for selecting a calling line from a set of available lines for which the number satisfies the parameters submitted in the dynamic code request, for calling the telephone of the user from the calling line and for transmitting the number of the calling line to said computer server;

said software module of the computer server of the online service also being suitable for comparing the dynamic code extracted from the number of the calling line received from the code server, and a dynamic code received from the network terminal of the user.

DESCRIPTION OF THE INVENTION

The invention will be better understood by referring to the following description and to the appended figures, in which.

The following description of the method according to the invention is made in the context of the conventional manual use of a dynamic code to allow access to an online services site, without this context being in any way limiting. It is understood that the method thus described can be used in many other circumstances, for example, without this list being exhaustive:

to perform the authentication of users in the case of access to digital services, the dynamic code then constituting one of the authentication factors;

to validate an action and check that the author is indeed who he or she pretends to be, as is useful to validate an online banking transaction;

to provide a random factor or a challenge to any application installed on the telephone of the user, such as, for example, a digital signature application.

Figure 1:
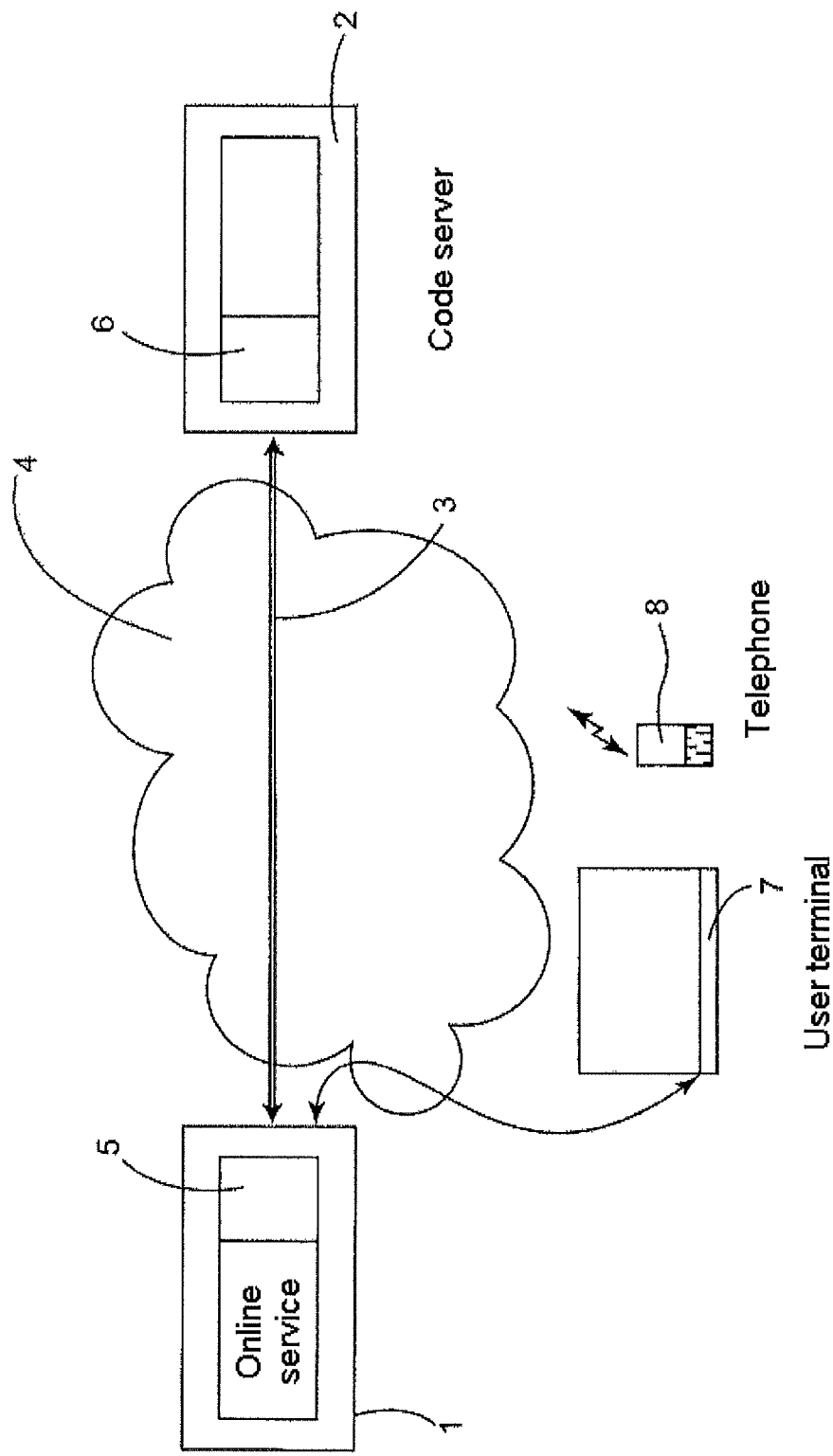
FIG. 1 represents a block diagram of a system suitable for implementing the method according to the invention.

Reference is made to FIG. 1. The method implements an online service which is executed by a computer server 1, a code server 2 connected to the computer server 1 via a secure digital link 3, supplied, for example, by a network 4 of internet type. The computer server 1 is a server like the many that exist in their thousands, apart from the fact that it hosts a specific software application, denoted 5, suitable for implementing, with the other components of the system, the method according to the invention, which will be described below.

Similarly, the code server 2 hosts a specific software application, denoted 6, suitable for implementing the method according to the invention, in cooperation with the other components of the system represented in FIG. 1.

It should be noted that there is no limit to the nature of the transactions envisaged in the context of the online service; they can be commercial or not, of banking or other type, inasmuch as a user has to be able to provide a dynamic code to the online service, at the request thereof.

Furthermore, on the user's side, the method according to the invention implements, on the one hand, a network terminal 7 and, on the other hand, a telephone 8, which can be a conventional cell phone, or a fixed telephone provided with a display, or even a computer device provided with a modem function.

The network terminal 7 is also connected to the computer server 1 via the digital network 4, in order for the user to be able to dialogue with the online service, notably to be able to provide it with his or her identifier and his or her password in the form of a dynamic code.

To be able to use the method, the online service may previously have registered the telephone number of the user.

Figure 2:
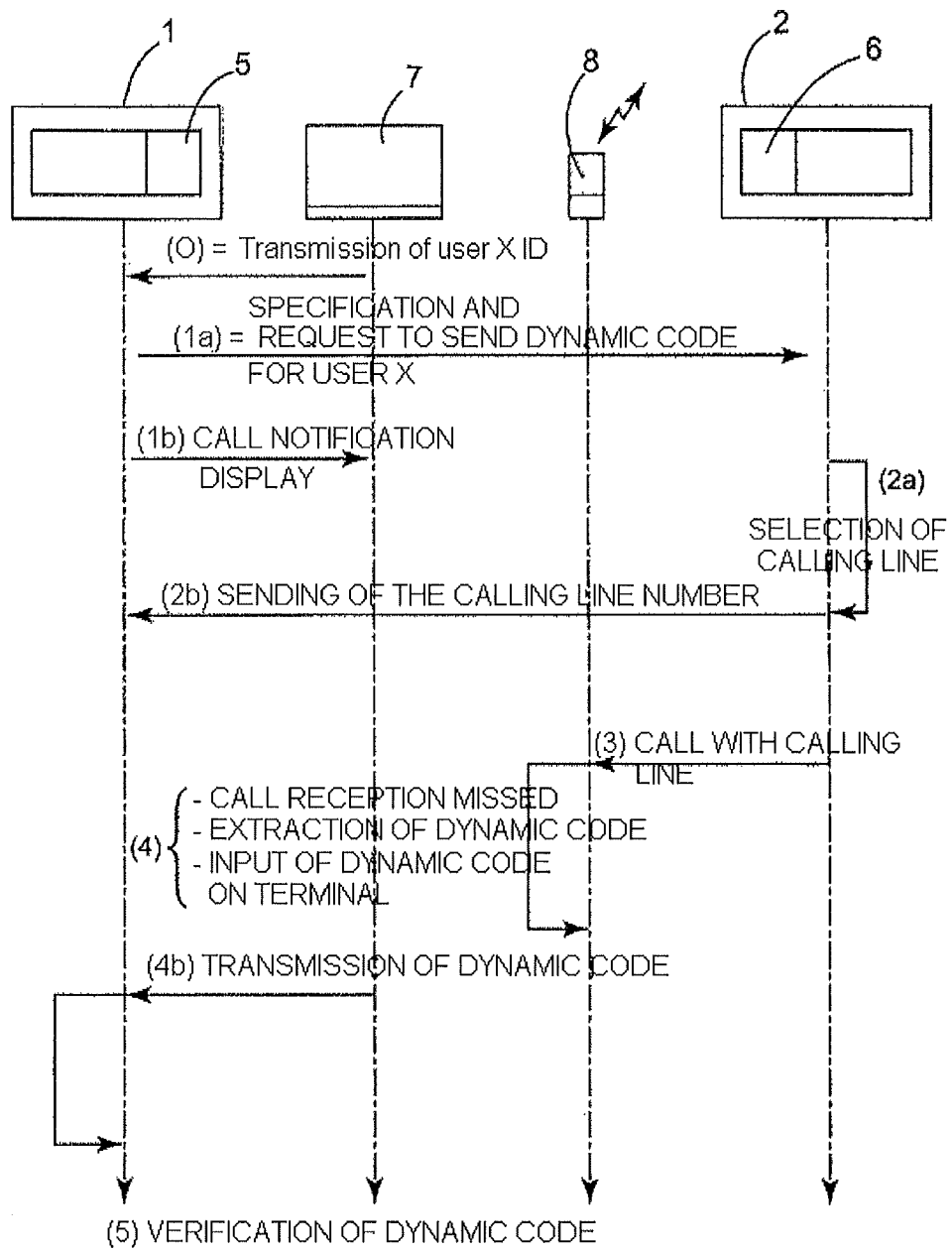
FIG. 2 represents an overall flow diagram of the method according to the invention, showing all the elements of the system implementing the different steps, including the network terminal and the telephone of the user.

There now follows a more detailed description through an example illustrated in FIG. 2, of the method for supplying a dynamic code according to the invention.

Preliminary step (0): transmission by the user of his or her identifier to the online service: when the user wants to connect to the online service, he or she enters his or her identifier on the user interface of the network terminal 7, which transmits it via the network 4 to the computer server 1 hosting the online service.

Step 1a: at the request of the online service, determination of the dynamic code specification parameters and generation of an extraction rule by the software application 5 and transmission of the request to send dynamic code to the software application 6 hosted by the code server 2;

The request to send dynamic code may vary according to the requirements of the application installed on the online server.

Depending on the use which will be made of the dynamic code, the online service will use an appropriate algorithm implemented by its application software to define the type of code that it wants to supply to the user by specifying a certain number of parameters which are as many constraints as the dynamic code will have to satisfy.

As a nonlimiting example, the parameters used to specify the type of code to be supplied to the user will comprise the following parameters:

P0: this parameter relates to the identifier of the user (if the latter is registered with the code server), or his or her telephone number.

P1: this parameter relates to the number N of digits that the dynamic code must contain, typically N is generally between 3 and 9;

P2: this parameter determines the type of extraction of the dynamic code from the calling line number. This extraction will be manual by the user, from the calling line number displayed on his or her telephone, or automatic and performed by a specific application installed on the telephone of the user.

P3: this parameter determines, as appropriate, any imposed values, namely the values of the digits which should appear in the dynamic code, if this is required by the online service. This may be a single imposed value, for example the first digit Cl of the dynamic code must be equal to 0. There may also be a requirement set by the online service concerning all the digits of the dynamic code, in this case it is the entire dynamic code which is determined. For example, for a 4-digit code, N=4 and an imposed dynamic code of 1234 for a given transaction.

P4: this parameter defines the extraction rule required. The extraction rule defines in which position each digit $C_i$ of the dynamic code should be situated in the number of the calling line $C_i(j)$; i=1,N. It is possible to have no extraction rule required notably when no value of $C_i$ is specified.

Depending on the requirements of the online service, the algorithm of the online service will define the type of code to be transmitted to the user and communicate, via a secure connection, this request to the code server specifying the required parameters (P0; P1; P2; P3; P4).

EXAMPLE 1 in the simplest case, the online service specifies no constraint for the dynamic code. In this case, the parameters indicated by the online service to the code server will be: P0; P1=undefined; P2=manual; P3=none; P4=none. The software of the code server will then execute a random selection of a calling line number from the available lines. This case is the one particularly suited to the replacement of a static password by a dynamic code for a "login".

Through the Example 1, the additional advantages of the method due to the parameterizing of the dynamic code request by the online service can be seen, namely that the online service can use a dynamic extraction method, that is to say define, on each dynamic code request, the number of digits that make up the dynamic code and the extraction rule. The security linked to the use of a dynamic code is thus reinforced by introducing additional random elements, in addition to the dynamic nature of the code itself, namely, in particular, the length of the dynamic code, or its extraction method.

The algorithm of the online service is therefore designed at the same time to specify, using the parameters described previously, both the characteristics of the dynamic code to be generated by the code server and its extraction mode.

Step 1b: substantially simultaneously with the request to send a dynamic code in 1a, the computer program of the online service reacts to the reception of the identifier of the user, by sending, to the network terminal 7 of the user, a message to be displayed, indicating the imminent arrival of a call which he or she must not answer and the procedure to be followed by the user upon the reception of this call from the calling line, that is to say in particular how to extract from the number of the calling line which will be displayed on his or her telephone, which digits of the number must be taken into account to make up the dynamic code.

For example, the message transmitted by the online service to the telephone of the user will be of the type: "you will be receiving a telephone call from a number beginning with +331234 . . . , do not answer this call and use the last 5 digits of this number as password"; simultaneously, the online service sends, via a secure connection 3, a dynamic code request to the code server by supplying it with all the parameters which the dynamic code must satisfy.

Step 2a: on reception of the dynamic code request, the specific software 6 of the code server 2 proceeds to select a calling line, from the available lines. This selection is made on the basis of the parameters indicated by the online service.

The code server launches its calling line selection algorithm. This algorithm will analyze the different constraints represented by the parameters Pi and search through all the available lines for those which can satisfy said parameters, then make a choice of a line which will be the calling line.

It might be thought that, in certain cases where the number of constraints would be too great, the algorithm may fail to find any calling line. In this case, the code server indicates to the online service the impossibility of satisfying this particular code request and suggests, for example, a relaxation of the constraints. The probability of culminating in an impossibility will be all the lower the greater the number of available lines.

In case of success, a calling line is selected by the code server which initiates a telephone call from the calling line to the telephone of the user and communicates the number of the calling line to the online service via a secure connection.

In the above Example 1, without constraint, the algorithm of the code server will make random selection of a line from the available lines and initiate a call to the telephone of the user from the calling line.

Step 2b: then transmission by the code server 2 of the calling line number selected in 2a, to the online service which communicates it to the specific software 5 in order for the latter then to be able to verify the code that will be input by the user in response to the call from the code server.

Step 3: next, the specific software 6 of the code server 2 initiates a telephone call to the telephone 8 of the user, using the calling line number selected previously (step 2a) as call number.

Preferably, when the software 6 of the code server 2 initiates a call to the telephone 8 of the user from the calling line (for example: +33123456789), it interrupts this call after the first ring to avoid having the call answered by the user. This makes it possible to have the number of the calling line (containing the dynamic code) displayed on the display of the telephone 8 of the user, without this call consuming communication units.

Step 4: the user discovers the incoming call and the number of the calling line displayed on his or her telephone 8. He or she then extracts the dynamic code therefrom. This extraction is done according to the indications given previously (step 1b) in the context of the dynamic code request sent by the online service.

Thus, in the example chosen, it will be sufficient for the user to read the last 5 digits of the displayed calling line number. However, many other "encodings" of the dynamic code within the number of the calling line will obviously be possible without departing from the framework of the present invention.

When the user has the dynamic code after its extraction, he or she inputs the dynamic code in the space provided for the input of the password on his or her network terminal 7. Thus, in the example chosen, the user inputs, on his or her network terminal 7, the last 5 digits of the calling line number which is displayed on his or her telephone 8.

Obviously, in 4b, the network terminal 7 transmits the input dynamic code to the software 5 of the online service.

Step 5: to finish, the software 5 of the online service compares the dynamic code received via the terminal 7 of the user, with that extracted from the calling line number transmitted previously (step 2b) by the code server for this user. If there is a match between the two codes, the software 5 of the online service authorizes the user to access the online service, otherwise it displays a message indicating to the user that his or her identification or validation attempt has failed.

Variants can be implemented on the basis of the basic outline of the method which has just been described. Thus, it would be possible for an online service to have its own dedicated code server, assigned to generate dynamic codes, rather than having to communicate with a remote and independent code server.

Figure 3:
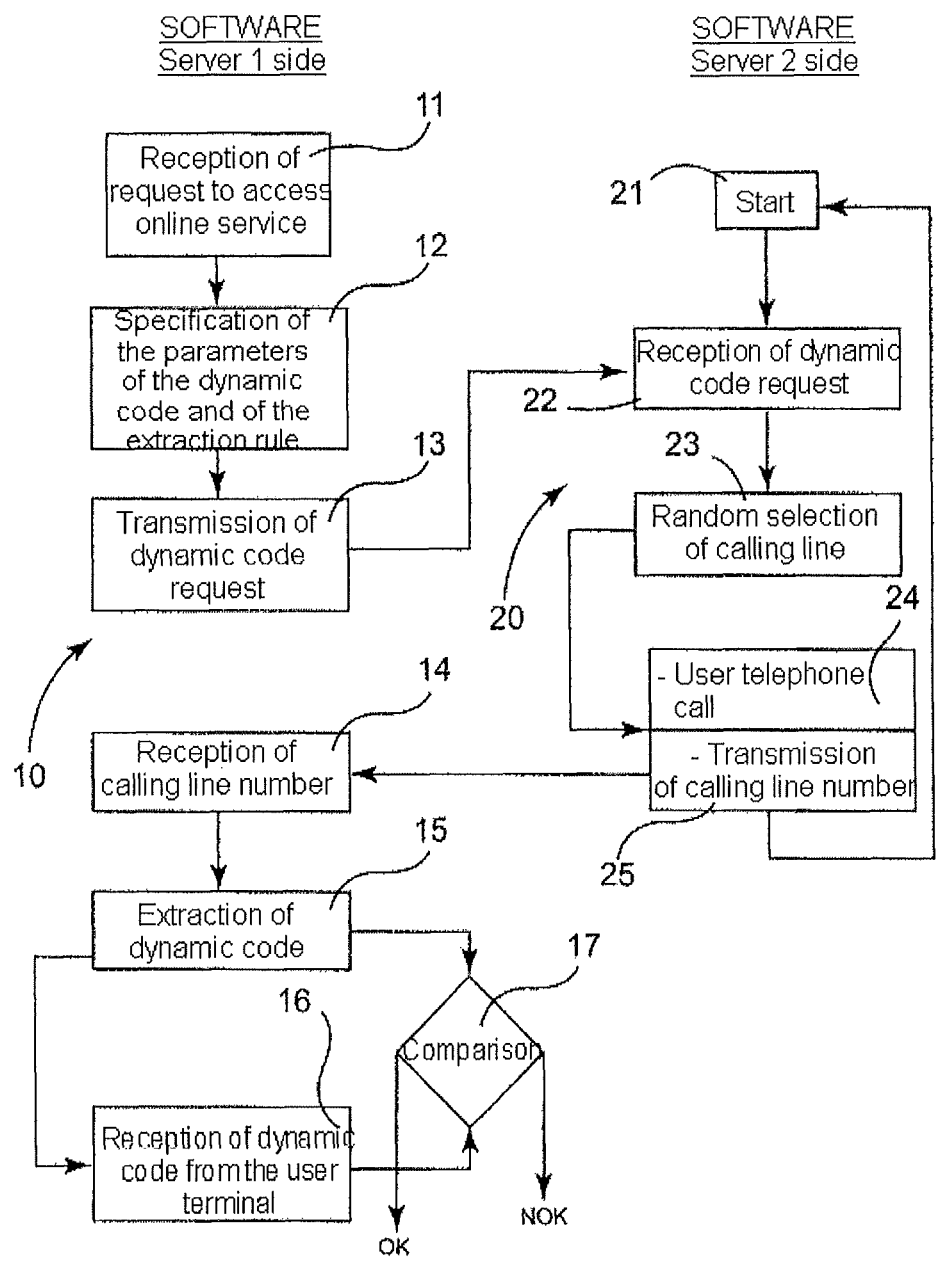
FIG. 3 represents a flow diagram of the steps of the method according to the invention, as implemented by the online service and by the code server.

Reference is now made to FIG. 3 in which is represented the simplified functional flow diagram of the specific software packages 5 and 6 to be installed respectively in the computer server 1 hosting the online service and in the code server 2, in order to be able to implement the online service method of the invention.

The left hand part of FIG. 3 represents the flow diagram 10 of the software 5 which should be run in the server 1 of the online service. This software comprises the following steps:
(11): reception from a user terminal 7 of a request to access the online service hosted by the computer server 1;
(12): generation of the specification (in the form of a series of parameters) of the dynamic code on the basis of the user and of the use which will be made of the dynamic code, and determination of the rule for extraction from the calling line number;
(13): transmission of a dynamic code request, providing a set of parameters which said code must satisfy, to the software 6 of the code server 2;
(14): reception of a calling line number, from the software 6 of the code server;
(15): local extraction of the dynamic code from the calling line number;
(16): reception of the dynamic code transmitted by the user terminal 7;
(17): comparison of the locally extracted dynamic code, and of the dynamic code transmitted by the user via his or her network terminal 7. If the two codes match, the dynamic code of the user is declared valid and the user's access to the online service is authorized; otherwise, an error message is prepared by the software 5 and transmitted to the online service for display on the network terminal of the user.

The right hand part of FIG. 3 represents the flow diagram 20 of the software 6 which must be run in the code server 2. This software comprises the following steps:
After the start 21:
(22): reception of the dynamic code request and of the parameters specifying it, transmitted by the software 5 of the server operating the online service;
(23): selection of a calling line, from the available lines, on the basis of the parameters specified in the dynamic code request by the online service;
(24): sending of a telephone call from the calling line, to the telephone number of the user;
(25): transmission of the number of the calling line to the software 5 of the online service, then return to the start (21) pending the next dynamic code request.

The software of the code server implements an algorithm for determining the number of the calling line, from the available lines, on the basis of the parameters of the code request which has been received from the online service.

To avoid having the transmission of the dynamic code to the user generate communication costs, a first alternative consists in having the call notification sent by the online service ask the user not to answer the call from the calling line, as described above. As a variant or as a complement, provision is advantageously made for the call made from the calling line by the code server to be interrupted by the code server itself after the first ring, so as to avoid having the user answer, bearing in mind that the call number will in any case remain displayed on the screen of the telephone of the user.

In all the embodiments of the method according to the invention, it is advantageous to assign a validity period to the dynamic code. This period can typically be set to a few minutes.

It may also be advantageous for the code server to arrange for its lines to have a portion of their number common, for example +33999-----.

This way, the user-friendliness of the method will be enhanced, because, when the user has become accustomed to this method, he will quickly recognize a call from the code server and will not be tempted to answer the call.

In another embodiment, the dynamic code, included in the number of the calling line, will be read automatically and used by an application installed on the telephone of the user.

This type of embodiment is particularly well suited to a situation in which a user has an application installed on his or her telephone, or where the use thereof requires a dynamic code to be supplied. In this case, the application will itself be adapted to automatically capture the dynamic code included in the number of the calling line.

As an example, this may correspond to the situation of an online bank user who will be asked by the online bank site to produce the digital signature of a transaction, using his or her signature application previously installed on his or her telephone and requiring a dynamic code.

The method is identical to the one already described up to the step of extraction by the user. In the dynamic code specification parameters, the online service indicates an automatic usage mode in P2 and specifies the parameters P3 and P4 in such a way that the application installed on the telephone of the user can extract dynamic code. At this stage, the user launches, on his or her telephone, the application which will use the dynamic code. The application will then either consult the log of incoming calls and select the last number (that of the calling line) or ask the user which incoming call number it should take into account. Once this selection is made, the application automatically extracts the dynamic code from the number of the calling line and performs the tasks for which it was designed.

ADVANTAGES OF THE INVENTION

The method according to the invention makes it possible to address the aims set, and offers a number of decisive advantages compared to the known methods for generating and supplying one-time codes.

Unlike the known methods, the dynamic code will not be generated in the cell phone itself, which would demand the onboard presence of specific software dedicated to this function.

Nor will the dynamic code be generated by the server of the online service then transmitted to the user via a conventional voice call or SMS, because that would introduce communication costs for the online service or for the user, which is what the invention aims to make disappear. On the contrary, in the method according to the invention, the sending of the dynamic code to the user does not generate any cost since there is no answer to the call made by the code server.

Furthermore, this method operates with all the existing cell phones without exception, and even with fixed-line telephones which have a display, or with computer systems provided with a modem and emulating the operation of a telephone. Consequently, this novel method can be used by the greatest possible number of subscribers to the telephony services. In most of the cases envisaged in practice, the dynamic code will be supplied to the user via his or her cell phone, which makes it possible to use the huge base, already installed, of cell phones.

The invention claimed is:

1. A method for supplying the user of an online service with a dynamic code via a telephone, comprising:
    supplying, by said user, by means of a network terminal connected to said computer server by a digital network, an identifier to a computer server operating an online service;
    selecting by a code server a calling line from a set of available lines to call a telephone of the user and used for calling the telephone of the user;
    determining a dynamic code to be used with the online service, wherein the dynamic code is determined by a dynamic code extraction rule that designates a subset of the digits that make up the number of the calling line to be taken into account to make up the dynamic code; and
    transmitting the calling-line number to the online service by the code server,
    wherein the number of the calling line, containing the dynamic code, is determined by an algorithm implemented by the code server, on the basis of a set of parameters included in a dynamic code request transmitted by the online service.

2. The method as claimed in claim 1, wherein, for a particular choice of the parameters included in the dynamic code request, the determination of the calling line number by the code server is made by a random selection of the number of the calling line from the numbers of available lines for the code server.

3. The method as claimed in claim 1, wherein the dynamic code extraction rule is either fixed, or defined by the online service on the occasion of each dynamic code request.

4. The method as claimed in claim 3, wherein the extraction rule comprises selecting the last 4, 5 or 6 digits of the number of the calling line to make up the dynamic code.

5. The method as claimed in claim 1, wherein the extraction of the dynamic code from the calling line number, on the basis of said extraction rule, is either performed manually by the user, or performed automatically by a software application installed on the telephone of the user.

6. The method as claimed in claim 5, wherein, in the case of manual extraction of the dynamic code by the user, the digits of the dynamic code are firstly chosen by the user from the display of the number of the calling line on the telephone of the user, on the basis of the extraction rule communicated by the online service to the user, then input on the network terminal of the user and communicated to the software of the online service.

7. The method as claimed in claim 5, wherein, in the case of automatic extraction of the dynamic code from the telephone number of the calling line, the telephone of the user is provided with software suitable for reading the number of the calling line, and for extracting the dynamic code therefrom on the basis of an extraction rule predefined in said software, or communicated by the online service to the telephone of the user.

8. A method for supplying the user of an online service with a dynamic code via a telephone, comprising the following steps:
    supplying, by said user, by means of a network terminal connected to said computer server by a digital network, an identifier to a computer server operating an online service;
    transmission by the online service to said code server of a request to send a dynamic code to a given user with the online service, together with a set of parameters specifying the dynamic code;
    transmission by the online service of a call notification sent to the network terminal of the user;
    selecting by a code server a calling line from a set of available lines to call a telephone of the user and used for calling the telephone of the user;
    determining a dynamic code to be used with the online service, wherein the dynamic code is determined by a dynamic code extraction rule that designates a subset of the digits that make up the number of the calling line to be taken into account to make up the dynamic code;
    transmission by the code server of the number of the duly selected calling line to the server of the online service, and extraction by said server of the dynamic code from the calling line number;
    initiation of a telephone call by the code server o the telephone of the user, by using the previously selected calling line number;
    on reception of the telephone call by the telephone of the user, manual or automatic extraction of the dynamic code on the basis of the calling line number and of the previously notified extraction rule;
    transmission by the user of the duly extracted dynamic code to the server of online service, by means of his or her network terminal; and
    on reception of the dynamic code by the server of the online service, comparison between the locally obtained dynamic code and the dynamic code transmitted by the user, and, if the two dynamic codes match, validation of the dynamic code transmitted by the user.

9. The method as claimed in claim 8, wherein the call notification is sent to the network terminal of the user to notify the user of a call emanating from the calling line whose number contains the dynamic code, and to communicate to the user the rule for extracting the dynamic code from the calling line number.

10. The method as claimed in claim 9, wherein the call notification transmitted to the network terminal of the user comprises instructions to not answer the call originating from the calling line.

11. The method as claimed in claim 8, wherein the code server is programmed to cut the telephone communication sent from the calling line to the telephone of the user after the first ring.

12. The method as claimed in claim 1, wherein the calling line number selected from the available lines of the code server is valid only for a limited period, of the order of a few minutes.

13. The method as claimed in claim 1, wherein the software of the online service implements the following steps:
reception on behalf of a user terminal of a request to access the online service hosted by the computer server;
generation of the specification of the dynamic code, in the form of a series of parameters, on the basis of the user and of the use which will be made of the dynamic code, and generation of the rule for extracting the dynamic code from the calling line number;
transmission of a dynamic code request to the code server and of a set of parameters specifying the dynamic code;
reception of a calling line number, from the code server;
local extraction on the server of the online service, of the dynamic code from the calling line number;
reception of the dynamic code transmitted by the user terminal;
comparison of the locally extracted dynamic code, and of the dynamic code transmitted by the user terminal, and if the two codes match, the dynamic code of the user is declared valid by the online service and the access of the user to the online service is authorized; otherwise, an error message is prepared by the software of the online service for display on the network terminal of the user.

14. The method as claimed in claim 1, wherein the software of the code server implements the following steps:
reception of the dynamic code request transmitted by the software of the server operating the online service, and of the parameters associated therewith;
selection of a calling line from the available lines, on the basis of the dynamic code request transmitted by the software of the server operating the online service, and of the parameters associated therewith;
sending of a telephone call from the duly selected calling line to the telephone number of the user; and
transmission of the number of the calling line to the software of the online service, then return to the start pending the next dynamic code request.

15. A system for supplying the user of an online service with a dynamic code via a telephone, in which said user supplies an identifier to a computer server operating an online service, and a dynamic code intended to be used by the user with the online service, said system comprising:
a network terminal connected to said computer server by a digital network;
a user telephone suitable for displaying the telephone number of a calling line;
a computer server operating an online service;
a code server linked to said computer server by a secure digital link;
said computer server operating the online service comprising a software module suitable for transmitting a dynamic code request to the code server;
said computer server comprising a software module suitable for specifying a dynamic code request in the form of a series of parameters, on the basis of the user and of the use of the dynamic code, for generating a rule for extracting the dynamic code and for transmitting such a dynamic code request to the code server;
said code server comprising a software module suitable for selecting a calling line from a set of available lines for which the number satisfies the parameters submitted in the dynamic code request, for calling the telephone of the user from the calling line and for transmitting the number of the calling line to said computer server, wherein the dynamic code is determined from the selected calling line by the rule for extracting the dynamic code, which designates digits of the number of the selected calling line to be taken into account to make up the dynamic code; and
said software module of the computer server of the online service also being suitable for comparing the dynamic code extracted from the number of the calling line received from the code server, and a dynamic code received from the network terminal of the user.

* * * * *